(12) United States Patent
Honda et al.

(10) Patent No.: US 12,403,610 B2
(45) Date of Patent: Sep. 2, 2025

(54) INFORMATION PROCESSING DEVICE AND ACTION MODE SETTING METHOD

(71) Applicant: SONY INTERACTIVE ENTERTAINMENT INC., Tokyo (JP)

(72) Inventors: Shinichi Honda, Tokyo (JP); Akio Ohba, Tokyo (JP); Hiroyuki Segawa, Tokyo (JP); Masanori Fukumoto, Tokyo (JP); Akihiko Sugawara, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 411 days.

(21) Appl. No.: 17/793,795

(22) PCT Filed: Feb. 12, 2021

(86) PCT No.: PCT/JP2021/005335
§ 371 (c)(1),
(2) Date: Jul. 19, 2022

(87) PCT Pub. No.: WO2021/166811
PCT Pub. Date: Aug. 26, 2021

(65) Prior Publication Data
US 2023/0073265 A1    Mar. 9, 2023

(30) Foreign Application Priority Data
Feb. 19, 2020   (JP) ................. 2020-026427

(51) Int. Cl.
*B25J 11/00*   (2006.01)
*B25J 13/00*   (2006.01)
(Continued)

(52) U.S. Cl.
CPC ......... *B25J 11/0015* (2013.01); *B25J 13/003* (2013.01); *B25J 19/023* (2013.01);
(Continued)

(58) Field of Classification Search
CPC .... B25J 11/0015; B25J 13/003; B25J 19/023; G06V 40/171; G06V 40/172; G06V 2201/07
See application file for complete search history.

(56) References Cited

U.S. PATENT DOCUMENTS 8,925,058 B1 * 12/2014 Dotan ................. H04L 63/0861
                                                        726/1
9,430,629 B1 *  8/2016 Ziraknejad ............ G06F 16/583
(Continued)

FOREIGN PATENT DOCUMENTS

JP    2004066418 A    3/2004
JP    2004-160630 A   6/2004
(Continued)

OTHER PUBLICATIONS

International Search Report and Written Opinion mailed Apr. 27, 2021, from PCT/JP2021/005335, 9 sheets.
(Continued)

*Primary Examiner* — David Perlman
(74) *Attorney, Agent, or Firm* — Kilpatrick Townsend & Stockton LLP

(57) ABSTRACT

A feature acquiring section 100 obtains feature data of a target person. A matching degree deriving section 110 derives a matching degree between the feature data and feature data of a registered user stored in a feature amount database 120. An identifying section 130 determines that the target person is the registered user in a case where the matching degree is greater than or equal to a first threshold, and determines that the target person is not the registered user in a case where the matching degree is less than a second threshold smaller than the first threshold. An action management section 140 sets an action mode of an acting subject according to the matching degree.

16 Claims, 6 Drawing Sheets

(51) Int. Cl.
*B25J 19/02* (2006.01)
*G06V 40/16* (2022.01)

(52) U.S. Cl.
CPC .......... *G06V 40/171* (2022.01); *G06V 40/172* (2022.01); *G06V 2201/07* (2022.01)

(56) References Cited

U.S. PATENT DOCUMENTS

| | | | | |
|---|---|---|---|---|
| 2009/0309700 A1* | 12/2009 | Fujita | ................... | G06V 40/172 340/5.82 |
| 2019/0332756 A1* | 10/2019 | Khitrov | ................... | G06V 40/70 |
| 2020/0169566 A1* | 5/2020 | Wolf | ....................... | H04L 63/08 |
| 2020/0314092 A1* | 10/2020 | Seul | ..................... | H04L 63/0861 |

FOREIGN PATENT DOCUMENTS

| | | |
|---|---|---|
| JP | 2010027034 A | 2/2010 |
| JP | 2017-042883 A | 3/2017 |
| WO | 2017175559 A1 | 10/2017 |

OTHER PUBLICATIONS

Notice of Allowance issued Jul. 18, 2023 in Japanese Patent Application No. 2020-026427, 5 pages.

\* cited by examiner

F I G. 1
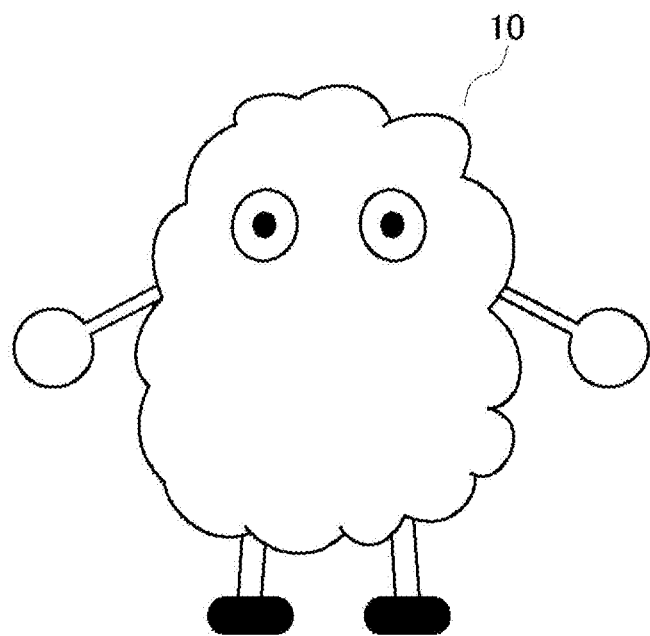
F I G. 2
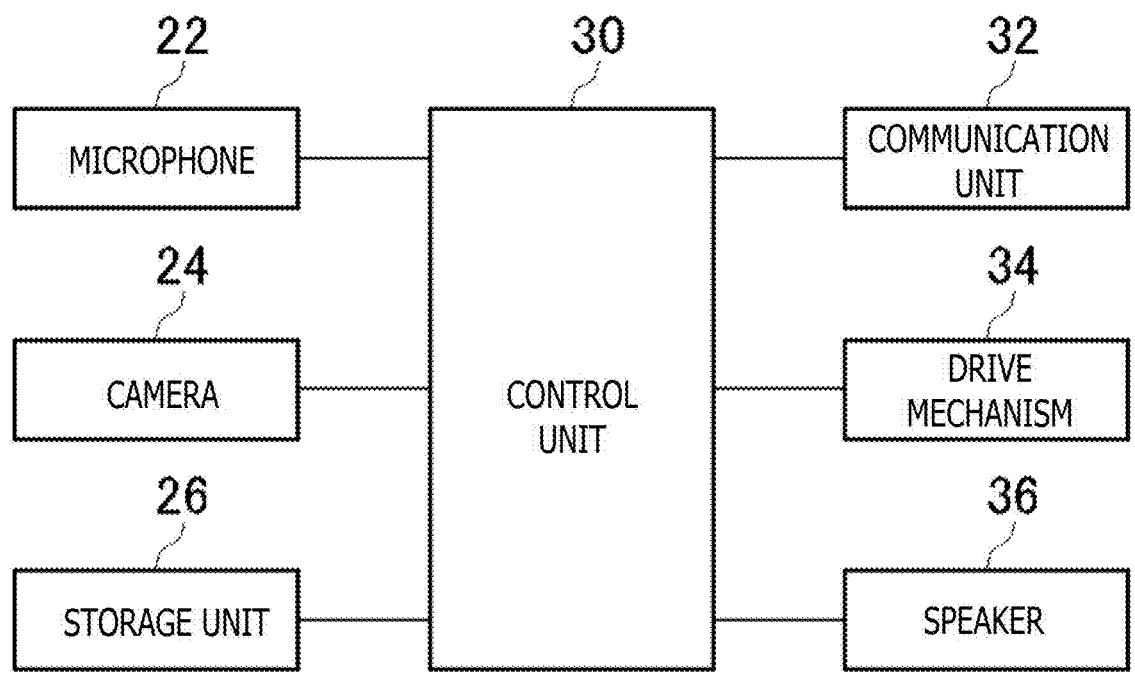

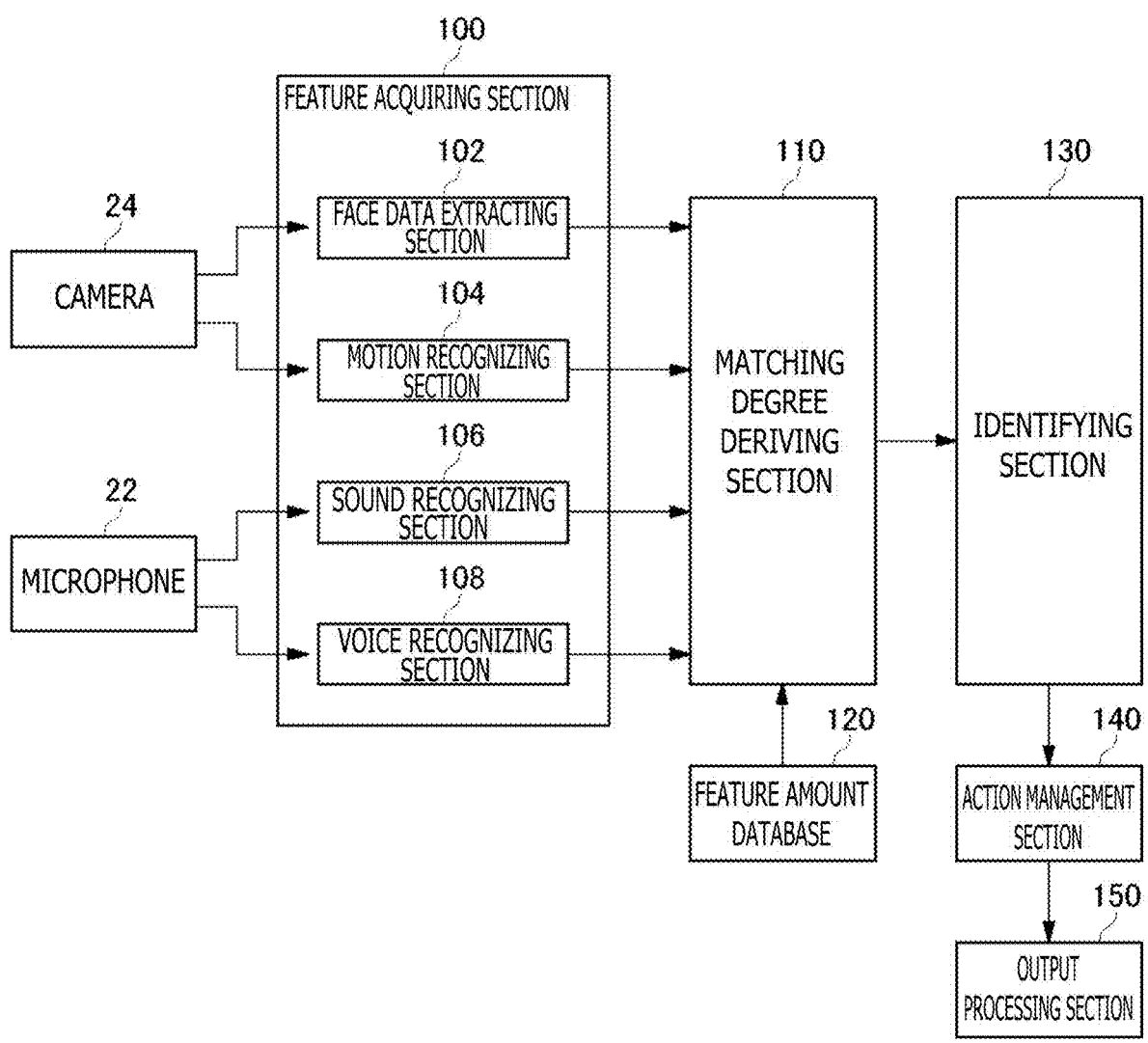

FIG. 4

| NAME | FIRST FEATURE DATA | SECOND FEATURE DATA | THIRD FEATURE DATA | FOURTH FEATURE DATA |
|---|---|---|---|---|
| A | FEATURE POINT OF FACE IMAGE | VOICEPRINT | HOBBY IS BASEBALL | POSITIVE REACTION TO BASEBALL TOPIC |
| B | FEATURE POINT OF FACE IMAGE | VOICEPRINT | HOBBY IS COOKING | NEGATIVE REACTION TO BASEBALL TOPIC |
| C | FEATURE POINT OF FACE IMAGE | VOICEPRINT | HOBBY IS SOCCER | NO REACTION TO COOKING TOPIC |
| D | FEATURE POINT OF FACE IMAGE | VOICEPRINT | HOBBY IS SEWING | REACTION EXPRESSING INTEREST IN COOKING TOPIC |

INFORMATION PROCESSING DEVICE AND ACTION MODE SETTING METHOD

TECHNICAL FIELD

The present invention relates to an information processing technique of identifying a target person from one or more registered users.

BACKGROUND ART

There are techniques to identify a user. For example, there is a method of authenticating a user with a password or the like, and a method of identifying an individual on the basis of information obtained from various sensors. Usually, the scenes that require user identification are often highly confidential situations, and therefore, a high degree of accuracy is inevitably required for the method for identifying the user. For example, in a bank, mistaken user identity leads to great damage, and thus, user identification by use of precise authentication means is performed for authentication at a bank's automatic teller machine (ATM).

SUMMARY

Technical Problem

The above-mentioned conventional technique requires a large-scale system and an expensive sensor in order to obtain an accurate authentication result. However, entertainment robots that interact with users do not require the high authentication accuracy required in banks. Robots that make a few mistakes sometimes make people more attached and are more suitable for entertainment use than robots that perform perfect user identification.

The present invention has been made in consideration of the above circumstances, and an object thereof is to provide a technique related to an object that adopts a user identification method which does not require high authentication accuracy, and that acquires additional information by itself and takes actions to improve authentication accuracy in a case where the user identification result is uncertain.

Solution to Problem

In order to solve the above-mentioned problem, an information processing device according to an aspect of the present invention includes a feature acquiring section that acquires feature data of a target person, a matching degree deriving section that derives a matching degree between the feature data and feature data of a registered user held in a database, an identifying section that determines that the target person is the registered user in a case where the matching degree is equal to or greater than a first threshold value, and determines that the target person is not the registered user in a case where the matching degree is less than a second threshold value smaller than the first threshold value, and an action management section that sets an action mode of an acting subject according to the matching degree.

Another aspect of the present invention is a method of setting an action mode of an action subject and includes a step of acquiring feature data of a target person, deriving a matching degree between the feature data and feature data of a registered user held in a database, a step of determining that the target person is the registered user in a case where the matching degree is equal to or greater than a first threshold value, and that the target person is not the registered user in a case where the matching degree is less than a second threshold value smaller than the first threshold value, and a step of setting an action mode of an acting subject according to the matching degree.

Another aspect of the present invention is a program that causes a computer to execute a function of acquiring feature data of a target person, a function of deriving a matching degree between the feature data and feature data of a registered user held in a database, a function of determining that the target person is the registered user in a case where the matching degree is equal to or greater than a first threshold value, and that the target person is not the registered user in a case where the matching degree is less than a second threshold value smaller than the first threshold value, and a function of setting an action mode of an acting subject according to the matching degree.

Any combinations of the above components and converted forms of the present invention between methods, devices, systems, computer programs, recording media storing readable computer programs, data structures, and the like are also effective as aspects of the present invention.

BRIEF DESCRIPTION OF DRAWINGS

FIG. 1 is a diagram illustrating an example of an appearance of a real object.

FIG. 2 is a diagram illustrating an input/output system of a robot.

FIG. 3 is a diagram illustrating functional blocks of an information processing device 20 that controls the object.

FIG. 4 is a diagram illustrating an example of a feature amount database.

DESCRIPTION OF EMBODIMENT

Figure 5:
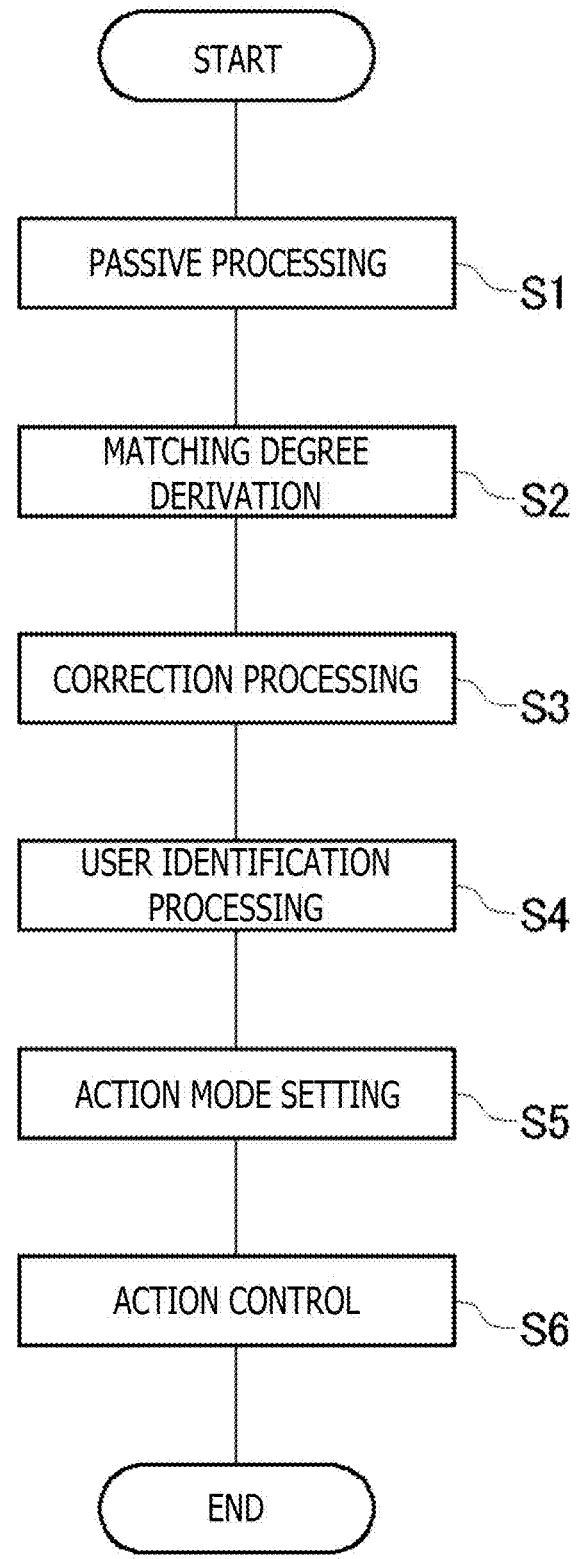
FIG. 5 is a flowchart of an action management method of the robot 10.

An object that is an acting subject of the embodiment includes a real object or a virtual object. The real object may be a robot capable of walking such as a humanoid or a pet-type robot, or equipment having a cylindrical shape or other shapes and incapable of walking, and at least can output voice. The object of the embodiment is an entertainment object that compares feature data of a target person acquired from output results of various mounted sensors with feature data stored in a database, and identifies the user due to matching, thereby communicating with the identified user appropriately.

The virtual object may be a character such as a person or a pet made by using a three-dimensional (3D) model, and exists in a virtual space generated by a computer. For example, the virtual object may be an agent on a television display and identifies the user and communicates appropriately with the user.

FIG. 1 illustrates an example of an appearance of a real object. This object is a humanoid robot 10, and is provided with a camera that acquires an image, a speaker that outputs voice, a microphone that inputs sound from the outside, a drive mechanism including a motor that moves each joint and a link that connects the motors to each other, and the like. The camera and the microphone play the role of a visual sensor and an acoustic sensor, respectively, and the feature data of the user to be used for user identification is extracted from the image data captured by the camera and the voice data obtained by the microphone. In addition, the robot 10 may be equipped with various existing sensors such as a gas (odor) sensor that detects an odor and an infrared sensor that grasps the surrounding situation by infrared rays. Incidentally, the robot 10 preferably has a dialogue function for talking with the user.

FIG. 2 illustrates an input/output system of the robot 10. A control unit 30 is a main processor that processes and outputs various data such as voice data and image data, and instructions. A microphone 22 collects surrounding sounds and converts the sounds into sound signals, and a camera 24 captures images of the surroundings to acquire captured images. A storage unit 26 includes a main storage section that temporarily stores data, instructions, and the like processed by the control unit 30, and an auxiliary storage section that stores feature data of one or more registered users registered in advance. A communication unit 32 may transmit the data output from the control unit 30 via the antenna to an external processing device or the like by wireless communication, and also may receive the data from the external processing device or the like to supply the data to the control unit 30.

The control unit 30 generates conversation data for communicating with the user to output voice from a speaker 36, and generates drive data for communicating with the user to rotate the motor of a drive mechanism 34. The drive mechanism 34 includes a motor incorporated in a joint portion that is a movable portion of the robot 10 and a link mechanism that connects the motors to each other, and an arm, a leg, a neck, and the like of the robot 10 are moved by driving the motor.

The microphone 22 and the camera 24 serve as sensors for recognizing an external state. In addition to this, the robot 10 is equipped with an odor sensor or the like, and feature data to be used for identifying a user is acquired from the detection results of these sensors. For example, the fundamental frequency can be acquired as feature data from the user's voice data acquired by the microphone 22 which is an acoustic sensor, and also, such feature data as the speech content acquired with use of the voice recognition result, the arrival direction of the sound source, and the distance from the amount of sound attenuation can be acquired. From image data acquired by the camera 24, which is a visual sensor, feature data indicating facial information such as the position of the user's eyes and the size of the mouth and physical characteristics such as height and physique can be acquired, and further, the user's facial expression in response to a specific topic, the user's motion in response to a certain action of the robot 10, and the like can be acquired as feature data.

FIG. 3 illustrates functional blocks of an information processing device 20 that controls an object such as the robot 10. The information processing device 20 includes sensors such as the camera 24 and the microphone 22, a feature acquiring section 100, a matching degree deriving section 110, a feature amount database 120, an identifying section 130, an action management section 140, and an output processing section 150. In a case where the object is the robot 10, the feature acquiring section 100, the matching degree deriving section 110, the identifying section 130, the action management section 140, and the output processing section 150 are mounted inside the robot 10 and may be achieved as functions executed by the control unit 30 illustrated in FIG. 2. Incidentally, the information processing device 20 may be provided as a processing device outside the robot 10.

As described above, the camera 24 and the microphone 22 serve as a sensor for acquiring the feature data of the user, and a sensor other than the camera 24 and the microphone 22 may be mounted. The feature acquiring section 100 acquires the feature data of the target person to be identified from the image data acquired from the camera 24 and the voice data acquired from the microphone 22, and provides the feature data to the matching degree deriving section 110. The feature acquiring section 100 includes a face data extracting section 102 and a motion recognizing section 104 that process image data, and a sound recognizing section 106 and a voice recognizing section 108 that process voice data.

The face data extracting section 102 extracts the feature data of the face of the target person who is the user to be identified, and specifically extracts the feature data on the relative positional relation, sizes, shapes, and the like of the face parts. The motion recognizing section 104 identifies changes in facial expressions and actions of the target person and acquires the resultant data as feature data of the target person. The sound recognizing section 106 acquires feature data such as a voiceprint from the voice data uttered by the target person. The voice recognizing section 108 acquires the semantic content of the user's utterance and acquires the feature data of the target person. Existing means may be used as a method of converting speech into text and interpreting the meaning for voice recognition.

The feature amount database 120 stores a plurality of types of feature data of one or more users. The feature data registered in the feature amount database 120 is data used for comparison with the feature data of the target person whose presence is detected by the robot 10 in the user identification processing. In the embodiment, the user registers his/her own feature data in the feature amount database 120 in advance in order to allow the entertainment robot 10 to identify the user. This registration processing is performed when the robot 10 is in the registration mode of registering the user, and when an image of the user is captured with the camera 24 and the user speaks to the microphone 22, the feature acquiring section 100 generates user's feature data and registers the feature data in the feature amount database 120, in association with the user's identification information (user ID).

The robot 10 performs processing of identifying a target person whose presence is detected in the same space as the robot 10. The feature acquiring section 100 acquires a plurality of types of feature data of the target person from the image data of the target person captured by the camera 24 and/or the voice data of the target person acquired by the microphone 22. The matching degree deriving section 110 compares the feature data of the target person acquired by the feature acquiring section 100 with the feature data of each registered user held in the feature amount database 120, and derives the matching degree between the feature data of the target person and the feature data of the registered user. In the embodiment, the feature acquiring section 100 acquires a plurality of types of feature data for one target person, and the matching degree deriving section 110 may derive the matching degrees with the feature data of a plurality of registered users for each of the plurality of types of feature data. The matching degree deriving section 110 may perform correction processing for increasing or decreasing the derived matching degree in consideration of the discrepancy of the values between the sensors and information regarding the time-series change of the matching degree. The correction processing of the matching degree will be described later.

The identifying section 130 determines whether the target person to be identified is a user registered in the feature amount database 120 or other than that, on the basis of the matching degree supplied from the matching degree deriving section 110. The action management section 140 sets an action mode that defines the action of the robot 10 that is an acting subject according to the matching degree derived by the matching degree deriving section 110, and determines the action of the robot 10 according to the action mode. The action management section 140 may set the action mode of the robot 10 according to the result of determination produced by the identifying section 130, on the basis of the matching degree and may determine the action of the robot 10 according to the action mode. The output processing section 150 controls the robot 10 so as to cause the robot 10 to take an action determined by the action management section 140.

In FIG. 3, each element described as functional blocks that perform various processes can include a circuit block, a memory, and other large scale integration (LSI) in terms of hardware, and is achieved by a program loaded into a memory, or the like, in terms of software. Therefore, it is understood by those skilled in the art that these functional blocks can be achieved in various forms by hardware only, software only, or a combination thereof, and the present invention is not limited to any of these.

The feature acquiring section 100 acquires feature data of the target person from sensor information of the microphone 22, the camera 24, or the like. In the embodiment, as a feature data acquisition procedure, the feature acquiring section 100 first acquires feature data in passive processing, and the feature data is obtained in active processing in a case where it is determined that further feature data is required according to the matching degree at that time. In the passive processing, the face data extracting section 102 and the sound recognizing section 106 generate the feature data, and in the active processing, the motion recognizing section 104 and the voice recognizing section 108 generate the feature data.

The face data extracting section 102 detects the facial parts of the target person from the input image data. For example, the relative positional relation, sizes, shapes, and the like of parts constituting the face such as the eyes, the eyebrows, the nose, and the mouth may be acquired as feature data. When the robot 10 prompts the target person to take some action, the motion recognizing section 104 recognizes the action taken by the user as a result. For example, in a case where the robot 10 utters the word "hug me" to the target person, the motion recognizing section 104 identifies what kind of action the target person has taken for the robot 10. For example, the motion recognizing section 104 identifies a state where the target person ignores the utterance of the robot 10, or identifies a state where the target person hugs the robot 10. In a case where the target person hugs the robot 10, the motion recognizing section 104 may identify the procedure which the target person has taken to hug the user. As a result of the hug, detailed facial information of the target person may be obtained.

The sound recognizing section 106 identifies the frequency of the voice obtained from the voice emitted by the target person. The sound recognizing section 106 may estimate the fundamental frequency and derive statistics such as the maximum value, the minimum value, and the average value, or may estimate the formant frequency. These are feature data for identifying the voice of the user. The voice recognizing section 108 performs voice recognition of the utterance of the target person through text conversion and semantic interpretation thereof, and acquires the utterance content obtained from the voice recognition. The user's emotion can also be estimated by acquiring not only the utterance content but also the intonation of the utterance. As the method of emotion estimation, an existing method may be used.

It is to be noted that the feature data acquired by the feature acquiring section 100 is not limited to these, and physical features such as height and body shape other than the face obtained from the image data, facial expressions, positions, distances, odors, and the like may be acquired as feature data, and the feature data may include all feature data obtained from existing sensors and useful for user identification. The feature data acquired by the feature acquiring section 100 is supplied to the matching degree deriving section 110.

FIG. 4 is an example of the feature amount database 120. The feature amount database records a plurality of types of feature data for each registered user. The identification information of the registered user (user identification (ID)) is registered in the first column. Here, the user ID may be a name. The feature data of each user is recorded in the second and subsequent columns. The feature data includes all the information for identifying the user, and includes not only quantitative information such as sensing data but also qualitative information such as a topic or hobby that the user likes and a reaction of the user in response to a call. In the embodiment, in addition to the feature points of the user's face and the voiceprint of the user which are acquired in the passive processing, the type of the user's reaction to a topic of the user's hobby or a specific topic which are acquired in the active processing is registered. As for the hobby, the user may be asked directly whether the user likes the hobby, or whether the user likes the hobby may be determined by obtaining a reaction based on the change of the user's facial expression or the intonation of the voice, in response to the topic related to the hobby.

As described above, the feature acquiring section 100 registers a plurality of types of feature data of each user in the feature amount database 120 in the registration mode of the feature data, but may extract the feature data in a normal conversation between the robot 10 and the user and may automatically register the feature data in the feature amount database 120. In any case, the feature data is preferably registered in a reliable environment. For example, feature data relating to the user's voice and face is preferably registered together with the user's name at the time of registering the user's name. After detecting the facial contour of the user, the face data extracting section 102 extracts the feature points of the contours and the edges of the eyes, the nose, and the mouth, and registers the relative positional relation between these in the feature amount database 120. The sound recognizing section 106 estimates the fundamental frequency and formant frequency of the user's voice and registers the estimation result in the feature amount database 120. In the embodiment, by registering first feature data which is the feature point of the face image together with second feature data which is the voiceprint of the voice, as a pair, the possibility of misidentification of the user due to the discrepancy in the sensing results of the sensors can be reduced. At the time of pre-registration, the robot 10 may naturally acquire information to be registered from a dialogue with a user such as self-introduction instead of a predetermined registration process.

As described above, a plurality of types of feature data of one or more registered users are registered in the feature amount database 120. On this premise, a target person is present around the robot 10, and a method in which the robot 10 identifies the target person will be described.

The feature acquiring section 100 acquires the feature data of the target person from the image data taken by the camera 24 and/or the voice data acquired by the microphone 22. The matching degree deriving section 110 derives the matching degree between the feature data of the target person acquired by the feature acquiring section 100 and the feature data of a registered user held in the feature amount database 120. In a case where the respective pieces of feature data of the four registered users A to D are registered as illustrated in FIG. 4, the matching degree deriving section 110 compares the feature data of the target person with the feature data of the four registered users A to D to calculate the matching degree between the pieces of feature data. The matching degree may be calculated in the form of how much percentage in 100%, for example.

In a case where the feature acquiring section 100 has acquired a plurality of types of feature data, the matching degree deriving section 110 calculates the matching degree with the feature data of the registered users for each of the plurality of types of feature data. For example, in a case where the face data extracting section 102 has acquired the feature data of the face image of the target person and the sound recognizing section 106 has acquired the voiceprint of the target person, the matching degree deriving section 110 reads out the first feature data and the second feature data of the registered user, and calculates the matching degree of each data. As a result of this, there may occur a discrepancy in the matching degree such that the matching degree of the user A is the highest regarding the facial feature data and the matching degree of the user B is the highest regarding the feature data of the voiceprint. This case will be described later.

In the embodiment, the matching degree deriving section 110 may calculate the matching degree by obtaining the distance between the feature data of the target person and the feature data of the registered user held in the feature amount database 120. For example, when calculating the matching degree of feature data of a face image, the matching degree deriving section 110 may calculate the distance between pieces of the feature data from a relative positional relation of each part such as the eyes, the eyebrows, the nose, and the mouth acquired by the face data extracting section 102, and the relative positional relation of the face parts of the registered user stored in the feature amount database 120, and may derive the matching degree from the calculated value. As a method for calculating the distance, an existing method may be used, and for example, the L2 norm distance between the feature data of the target person and the feature data registered in the feature amount database 120 may be calculated. In this method, when the calculation result is 0 (when there is no difference), the matching degree is maximum (100%). The matching degree deriving section 110 may derive the matching degree by use of the following Equation 1. According to Equation 1, the output value can be calculated such that the matching degree is maximized when the distance is 0.

$$\text{(Matching degree)} = 1/(L2 \text{ distance} + 1) \qquad \text{(Equation 1)}$$

In addition, a deep learning method may be used when deriving the matching degree. That is, clustering processing may be performed by acquiring a plurality of user data (images or voices) and causing a neural network to learn on the basis of the data. In this case, the output value of the output layer of each class (which user it is) may be used as the matching degree. In addition, an existing method may be adopted as a method for deriving the matching degree by comparing pieces of feature data with each other.

The matching degree deriving section 110 may perform correction processing of increasing or decreasing the matching degree derived by comparing the feature data acquired by the feature acquiring section 100 with feature data registered in the feature amount database 120. Since there are factors that cause various errors in the processing of acquiring the feature data of the target person, the matching degree deriving section 110 preferably determines the final matching degree in consideration of these factors. Specific factors for increasing or decreasing the matching degree will be described later.

The identifying section 130 performs identification processing of the target person on the basis of the matching degree derived by the matching degree deriving section 110. Here, the identifying section 130 determines whether the target person is the registered user or is not the registered user, or alternatively determines whether there is a possibility that the target person is the registered user, on the basis of the magnitude of the matching degree.

The identifying section 130 determines that the target person is the registered user in a case where the matching degree is equal to or greater than a first threshold value, and determines that the target person is not the registered user in a case where the matching degree is less than a second threshold value smaller than the first threshold value. Note that, in a case where the matching degree is smaller than the first threshold value and equal to or greater than the second threshold value, the identifying section 130 does not determine whether the target person is the registered user or not.

The action management section 140 sets the action mode of the robot 10 according to the matching degree, and determines the action of the robot 10 according to the set action mode. The action mode includes a first mode on the premise of having confidence that the target person is the registered user, a second mode on the premise that whether or not the target person is the registered user is uncertain, and a third mode on the premise of having confidence that the target person is not the registered user. In the embodiment, interaction is made with the user with a definite attitude in the first mode, an unconfident attitude in the second mode, and a formal attitude in the third mode.

The action management section 140 sets the action mode to the first mode in a case where the matching degree is equal to or greater than the first threshold value, and sets the action mode to the second mode in a case where the matching degree is smaller than the first threshold value and equal to or greater than the second threshold value, and sets the action mode to the third mode in a case where the matching degree is less than the second threshold value.

The first mode is an action mode set on the premise that the target person can be recognized as a specific registered user. In this first mode, since the robot 10 knows who the conversation partner is, it becomes possible to actively and smoothly communicate with each other, for example, by presenting a topic according to the specific partner, thereby allowing the robot 10 to take an action of a high entertainment property. In contrast, since the third mode is an action mode set on the premise that the target person can be recognized as being not the registered user, the robot 10 considers that the target person is other than the registered user, and takes an indifferent attitude and presents bland topics.

The second mode is set when it is uncertain whether or not the target person is the registered user, and is an action mode of behaving in a different manner or communicating in a different tone from the first mode. In this second mode, the robot 10 intentionally takes an unconfident attitude and performs an action called active processing for acquiring feature data of the target person. In the active processing, the robot 10 is made to perform an action for encouraging the action of the target person for the purpose of increasing the matching degree. For example, in a case where the matching degree regarding the voice data is low, the action management section 140 causes the robot 10 to act so as to talk to the user in order to collect the user's voice. On the contrary, when the matching degree with the image data is low, the action management section 140 may cause the robot 10 to move closer to the user side such that the robot 10 can capture an image of the target person nearby, or to take actions to encourage the user to take some action, such as taking a pose indicating that the robot 10 wants to be picked up by the user. In addition, the action management section 140 can also cause the robot 10 to take an action such as directly asking the user's name or a password. The matching degree deriving section 110 acquires the feature data of the target person from the action of the target person.

As an example of the active processing, the individual reaction of the registered user to a common specific talk may be stored in the feature amount database 120 to be used for deriving the matching degree. For example, from the reaction of the registered user in response to the call "Hey!" change in the fundamental frequency or a response to the presentation of conversation (result of voice recognition) is acquired, and this may be stored as feature data in the feature amount database 120 to be used for derivation of the matching degree. In addition to the voice, changes in facial expressions at the time of being spoken to and body movements such as how to turn around and how to make an approach may be stored in the feature amount database 120 and used for deriving the matching degree.

Also, as another example of active processing, a reaction to a user's specific topic, such as an estimated emotion may be used to derive a matching degree. For example, when registering feature data, the robot 10 presents to the user a topic regarding a specific team of a sport such as baseball or soccer. The robot 10 estimates emotions from the user's response to the topic regarding a specific team, specifically, the user's utterances and/or changes in facial expressions, and stores the decision whether the user has positive emotions or negative emotions for the specific team in the feature amount database 120. The content of the topic and the emotion estimated at that time can be used as feature data for deriving the matching degree in active processing. As the method of emotion estimation, an existing method such as an emotion estimation method with use of a fundamental frequency may be used.

The output processing section 150 causes the robot 10 to output the action determined by the action management section 140. For example, the output processing section 150 outputs voice from the speaker 36 or moves the drive mechanism 34 to cause the robot 10 to perform a determined action.

FIG. 5 is a flowchart of the action management method of the robot 10. In the embodiment, the feature amount database 120 holds feature data of a plurality of persons.

The feature acquiring section 100 performs passive processing of acquiring each feature data by acquiring image data and sound data of the target person at regular intervals (S1). The feature data obtained by the passive processing is the feature data acquired by the face data extracting section 102 and the feature data acquired by the sound recognizing section 106. The feature acquiring section 100 provides the feature data acquired by the passive processing to the matching degree deriving section 110, and the matching degree deriving section 110 compares the feature data with the feature data of a registered user held in the feature amount database 120 to derive the matching degree for each feature data (S2). The matching degree deriving section 110 may derive the matching degree for each feature data by calculating the distance between the pieces of feature data.

The matching degree deriving section 110 performs correction processing for adjusting an error component based on various factors with respect to the matching degree derived for each feature data (S3). To be specific, the matching degree deriving section 110 determines that the reliability of the calculated matching degree is low in a case where a matching degree reducing factor occurs with respect to the matching degree calculated for each feature data, and then reduces the value of the matching degree. The matching degree reducing factor is a factor for lowering the reliability of the calculated matching degree, and for example, this occurs because the quality of the sound input signal is deteriorated due to a high noise floor or the like. The matching degree deriving section 110 makes a correction so as to reduce the calculated matching degree of the sound feature data in a case where the matching degree reducing factor related to the sound is generated. Further, the matching degree deriving section 110 makes a correction so as to reduce the matching degree of the image feature data in a case where there is a factor that deteriorates the input signal quality of the image, such as the case of a poor signal/noise (S/N) ratio of the camera. In a case of occurrence of a matching degree reducing factor that lowers the recognition accuracy of the sensor, the matching degree deriving section 110 preferably makes a correction so as to reduce the calculated matching degree. Incidentally, the matching degree deriving section 110 may also perform matching degree correction processing on the feature data acquired in the active processing to be described later. To be specific, the matching degree may be reduced in a case where the voice recognition result does not match a grammatical rule or in a case where the target person takes an ambiguous attitude toward a specific topic.

In a case where the matching degree deriving section 110 derives matching degrees of a plurality of types of feature data, the consistency of each matching degree may be evaluated. For example, in a case where the matching degree deriving section 110 determines that the matching degrees between the target person and the registered user A regarding the sound feature data and the image feature data are both calculated to be equal to or more than the first threshold value (80%), it is evaluated that the matching degrees of the sound feature data and the image feature data are consistent and the plurality of calculated matching degrees are determined as highly reliable calculated values.

On the other hand, in a case where the matching degrees of the sound feature data and the image feature data are not consistent, the matching degree deriving section 110 reduces the calculated matching degree of each of the feature data. For example, in a case where the matching degree of the sound feature data is calculated to be 80% and the matching degree of the image feature data is calculated to be 30% between the target person and the registered user A, the matching degree deriving section 110 corrects the matching degree of the sound feature data to 70% and the matching degree of the image feature data to 20%, that is, performs correction processing to reduce each matching degree by 10%. In a case where a difference between the matching degrees of a plurality of types of feature data is equal to or greater than a predetermined threshold value, the matching degree deriving section 110 determines that the reliability of each matching degree is low, and may carry out the correction processing to reduce the value of each matching degree.

The matching degree deriving section 110 derives the matching degree with the feature data of each user for a plurality of types of feature data. That is, the matching degree deriving section 110 derives the matching degree of the sound and image feature data between the target person and the user A, derives the matching degree of the sound and image feature data between the target person and the user B, derives the matching degree of the sound and image feature data between the target person and the user C, and derives the matching degree of the sound and image feature data between the target person and the user D.

The matching degree deriving section 110 may perform processing of integrating the matching degrees with respect to a plurality of types of feature data for each user. For example, in a case where the matching degree of the sound feature data is 90% and the matching degree of the image feature data is 80% between the target person and the registered user A, the matching degree deriving section 110 calculates integrated matching degrees of these. The integrated matching degree is an index representing a plurality of matching degrees in the user identification processing in the identifying section 130. For example, the matching degree deriving section 110 may average these to calculate the integrated matching degree. In this case, the integrated matching degree is calculated to be 85%. Note that the matching degree deriving section 110 may derive the highest matching degree among the plurality of matching degrees as the integrated matching degree. In this case, the integrated matching degree is calculated to be 90%. It is predetermined whether the matching degree deriving section 110 performs the integration processing by averaging a plurality of matching degrees or performs the integration processing by adopting the highest matching degree. The matching degree deriving section 110 provides the integrated matching degree calculated for each user to the identifying section 130. In the embodiment, the matching degree deriving section 110 provides the integrated matching degree of each of the registered users A to D to the identifying section 130.

In the user identification processing, first, the identifying section 130 identifies a registered user who exhibits the highest integrated matching degree with the feature data of the target person.

In a case where the integrated matching degree of one registered user is equal to or greater than the first threshold value (80%) and the integrated matching degrees of the other registered users are less than 80%, the identifying section 130 determines that the target person is the registered user indicating the integrated matching degree of 80% or more. For example, in a case where the matching degree deriving section 110 derives an integrated matching degree of 80% for the registered user A and an integrated matching degrees of 10% for the registered users B, C, and D, the identifying section 130 determines that the target person is the registered user A.

In a case where the integrated matching degree of the registered user exhibiting the highest integrated matching degree with the feature data of the target person is less than the first threshold value (80%) and equal to or more than the second threshold value (30%), the identifying section 130 makes a tentative identification to determine that the target person may be the registered user exhibiting the highest integrated matching degree. However, the identifying section 130 does not determine that the target person is the registered user exhibiting the highest integrated matching degree. For example, in a case where the matching degree deriving section 110 derives an integrated matching degree of 70% for the registered user A, 50% for the registered user B, and 10% for the registered users C and D, the identifying section 130 determines that the target person is most likely to be the registered user A.

In a case where the integrated matching degree of the registered user indicating the highest integrated matching degree with the feature data of the target person is less than the second threshold value (30%), the identifying section 130 determines that the target person is not any registered user. For example, in a case where the matching degree deriving section 110 derives an integrated matching degree of 10% for the registered users A, B, C, and D, the identifying section 130 determines that the target person is an unrelated person other than the registered users.

The identifying section 130 provides the determination result to the action management section 140. The action management section 140 sets the action mode of the robot 10 according to the determination result. Since the determination result of the identifying section 130 is based on the integrated matching degree derived by the matching degree deriving section 110 in the embodiment, the action management section 140 sets the action mode of the robot 10 according to the integrated matching degree (S5).

Figure 6:
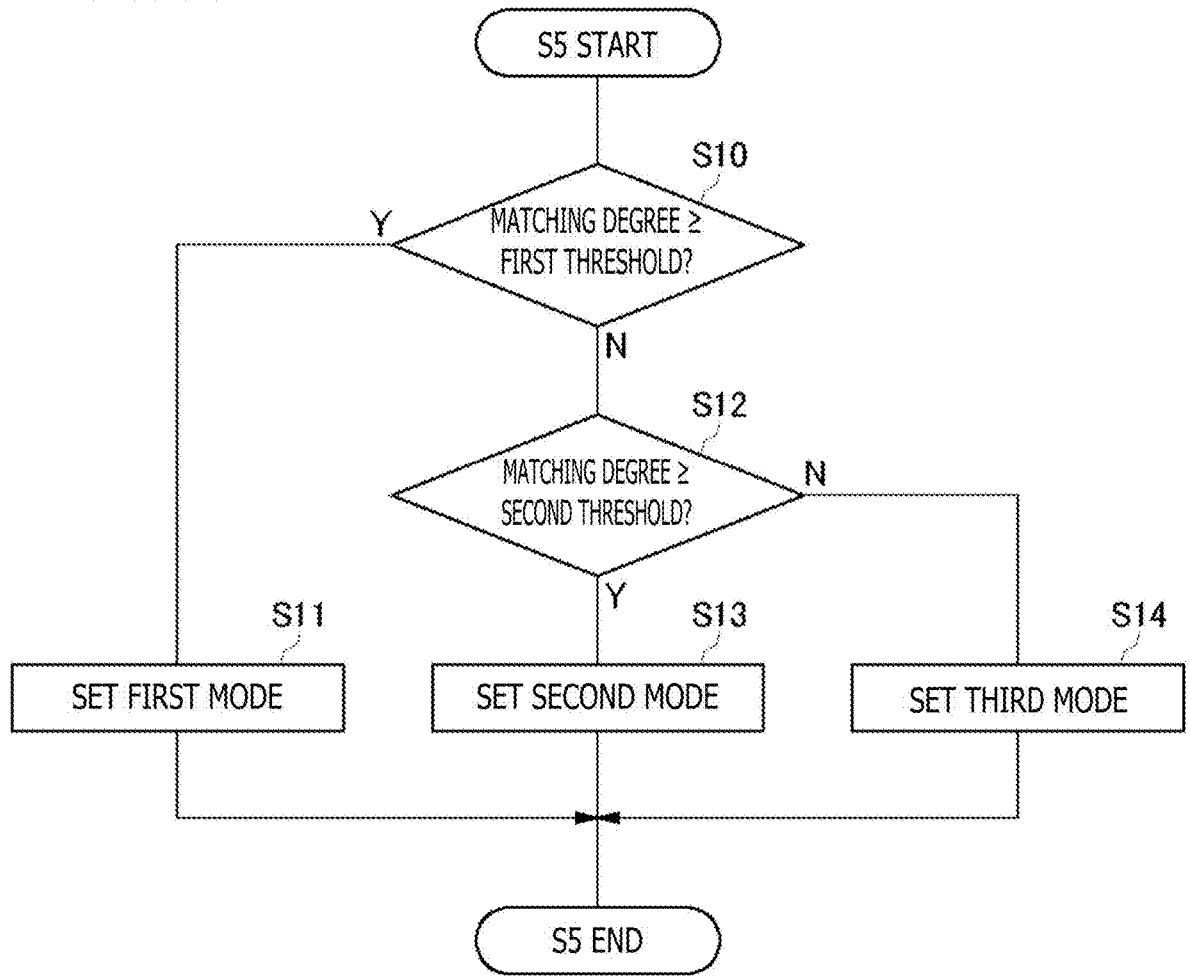
FIG. 6 is a flowchart of an action mode setting method.

FIG. 6 is a flowchart of a method of setting an action mode. The action mode setting processing is performed on the registered user who exhibits the highest integrated matching degree with the feature data of the target person.

In a case where the integrated matching degree of the registered user is equal to or greater than the first threshold value (80%) (Y in S10), the action management section 140 sets the action mode of the robot 10 to the first mode (S11). In a case where the integrated matching degree of the registered user is less than the first threshold value (80%) (N of S10) and equal to or more than the second threshold value (30%) (Y of S12), the action management section 140 sets the action mode of the robot 10 to the second mode (S13). In a case where the integrated matching degree of the registered user is less than the second threshold value (30%) (N in S12), the action management section 140 sets the action mode of the robot 10 to the third mode (S14). The action management section 140 provides the output processing section 150 with the action content according to the set action mode and the identification information of the registered user.

Returning to FIG. 5, the output processing section 150 controls the output of the robot 10 according to the action content (S6). In a case where the action mode is set to the second mode, the output processing section 150 causes the robot 10 to perform active processing for the registered user such as talking to the target person who is likely to be but cannot be determined to be the registered user to present a topic regarding the registered user's favorite sports team, or taking a close-up photo of the face by approaching the target person.

It should be noted that, in the above example, since the integrated matching degrees of 70% for the registered user A and 50% for the registered user B are derived, the output processing section 150 executes the active processing for the registered user A, and as a result, in a case where the matching degree between the target person and the registered user A does not increase, the active processing for the registered user B may be performed.

A case where the action mode is set to the first mode and the integrated matching degree of a plurality of registered users is 80% or more will be described. In this case, the output processing section 150 operates the robot 10 in the first mode on the premise that the target person is the registered user exhibiting the highest integrated matching degree, but also during the operation, the matching degree deriving section 110 updates the integrated matching degree by comparing the feature data of the target person with the feature data of the registered user. As a result, in a case where the integrated matching degree of another registered user exceeds this, the output processing section 150 may operate the robot 10 in the first mode on the premise that the other registered user is the target person.

The present invention has been described above on the basis of the embodiment. The embodiment is an example, and it is understood by those skilled in the art that various modifications are possible for combinations of each of these components and each processing process, and that such modifications are also within the scope of the present invention.

Figure 7:
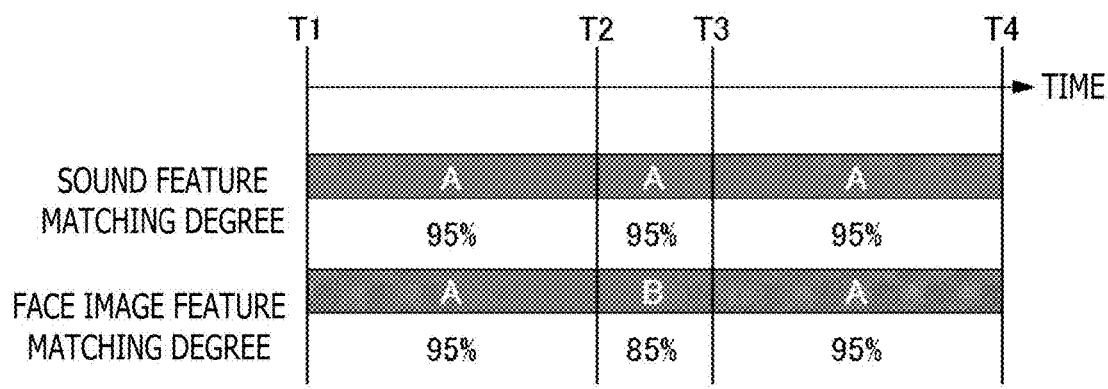
FIG. 7 is a diagram illustrating an example of a matching degree of feature data of sounds and images derived in a time-series manner.

FIG. 7 illustrates an example of the matching degree of the sound and image feature data derived in a time-series manner. FIG. 7 illustrates the registered user indicating the highest matching degree and the value of the matching degree on a time-series basis, with respect to the sound feature data and the facial image feature data of the same target person, acquired by the feature acquiring section 100. During the period from T1 when the acquisition of the feature data is started to T2 and the period from T3 to T4, the sound feature data and the facial image feature data both illustrate a 95% matching degree for the registered user A, and during the period from T2 to T3, the sound feature data exhibits a 95% matching degree with the registered user A, and the facial image feature data exhibits an 85% matching degree for the registered user B.

In the embodiment, the identifying section 130 determines that the registered user exhibiting the highest integrated matching degree with the feature data of the target person is the target person on the condition that the integrated matching degree is 80% or more. According to this identification processing, the target person is identified as the user A from the integrated matching degree between T1 and T2 and between T3 and T4, but between T2 and T3, if the matching degree of the facial image feature data of the user A is significantly reduced and the integrated matching degree of the user A is lower than the integrated matching degree of the user B, the target person will be identified as the user B.

However, in the modification example, importance is attached to the matching degree in the time series information before and after that period (the periods from T1 to T2 and from T3 to T4), and the identifying section 130 identifies the target person as the user A also between T2 and T3 even if the user B has a greater integrated matching degree. That is, in a case where the identifying section 130 continuously determines on a time-series basis that the target person is the registered user A, the identifying section 130 continuously determines that the target person is the registered user A even if the matching degree deriving section 110 derives the matching degree between the target person and the registered user A, which is lower than the matching degree between the target person and the registered user B, at a certain time point T2.

In this example, at time point T2, the matching degree of the facial image feature data of the registered user A drops, which may be simply due to another person crossing in front of the registered user A. Since such a cause is expected to be resolved in a short time, it is not preferable to change the identification result of the target person immediately.

In the example of FIG. 7, the matching degree deriving section 110 holds the matching degree between the target person and the registered user A derived in a time series manner before the time point T2. Then, while continuing to derive the matching degree between the target person and the registered user B, which is greater than the matching degree between the target person and the registered user A after the time point T2, the matching degree deriving section 110 continues to decrease the matching degree held therein. This is because it is appropriate that the matching degree of the registered user A is gradually lowered in a case where the integrated matching degrees of the registered user A and the registered user B continues to indicate the reversed result. As a result, in a case where the matching degree of the registered user A is lower than the first threshold value (80%), the identifying section 130 may determine that the target person is not the registered user A but the registered user B. At this time, it is premised that the integrated matching degree of the registered user B is 80% or more.

Figure 8:
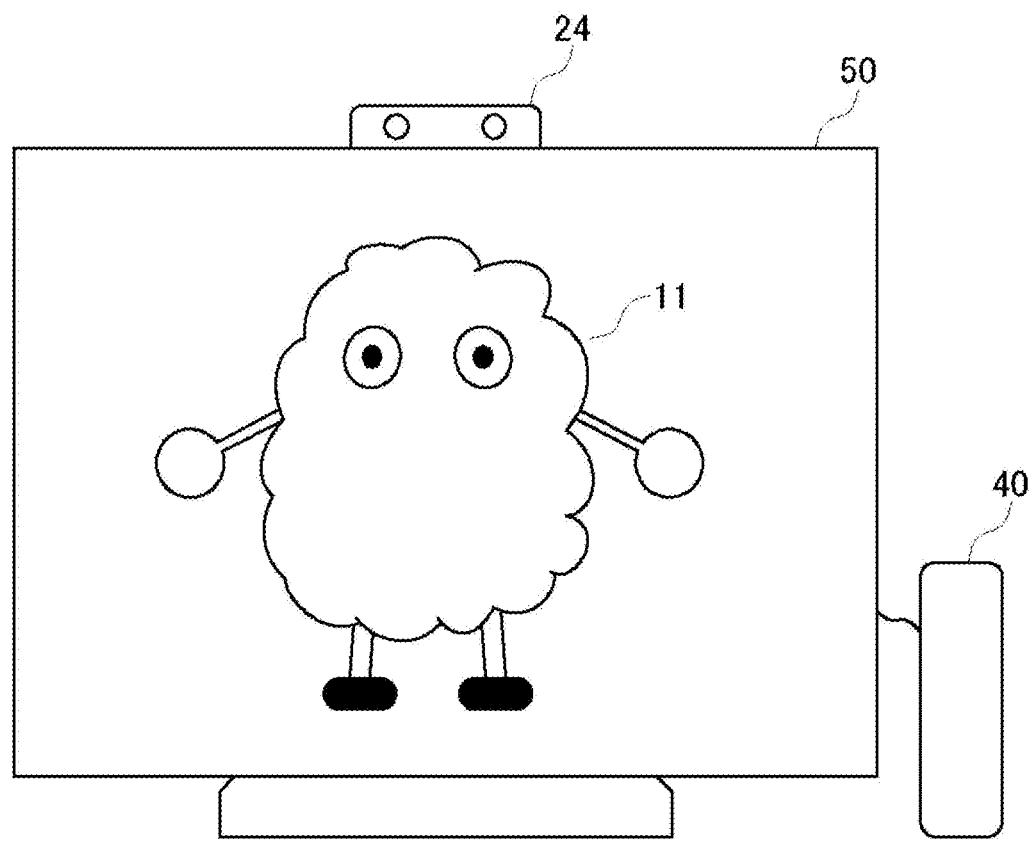
FIG. 8 is a diagram illustrating a modification example in a case where the object is a virtual object.

FIG. 8 illustrates an outline of a modification in a case where the object is a virtual object. A virtual object 11 may be an agent displayed on a display 50 of the television connected to an information processing device 40. The information processing device 40 acquires various information such as images and voices by the connected camera 24 and microphone 22, and compares the feature data obtained from the acquired information with the feature data in the feature amount database 120 to identify the user and then determine the action of the virtual object 11. The information processing device 40 outputs a video corresponding to the action of the agent on the display, and at the same time, outputs voice by use of a speaker provided in the television. As described above, the information processing device 40 has the configuration and functions of the information processing device 20 described in the embodiment, and may control the action of the virtual object 11.

INDUSTRIAL APPLICABILITY

The present invention can be used in the technical field of identifying a target person.

REFERENCE SIGNS LIST

10: Robot
11: Virtual object
22: Microphone
24: Camera
26: Storage unit
30: Control unit
32: Communication unit
34: Drive mechanism
36: Speaker
40: Information processing device
50: Display
100: Feature acquiring section
102: Face data extracting section
104: Motion recognizing section
106: Sound recognizing section
108: Voice recognizing section
110: Matching degree deriving section 120: Feature amount database
130: Identifying section
140: Action management section
150: Output processing section

The invention claimed is:

1. An information processing device comprising:
processing circuitry configured to
acquire feature data of a target person;
derive a matching degree between the feature data and feature data of a registered user held in a database;
determine that the target person is the registered user in a case where the matching degree is equal to or greater than a first threshold value, and determine that the target person is not the registered user in a case where the matching degree is less than a second threshold value smaller than the first threshold value;
set an action mode of an acting subject according to the matching degree;
perform correction processing of increasing or decreasing the matching degree derived from the feature data of the target person and the feature data of the registered user held in the database; and
in a case where it is continuously determined on a time-series basis that the target person is a first registered user, determine that the target person is the first registered user even if the derived matching degree between the target person and the first registered user is lower than a matching degree between the target person and a second registered user at a time point.

2. The information processing device according to claim 1, wherein the processing circuitry is further configured to set the action mode to a first mode in a case where the matching degree is equal to or greater than the first threshold value, set the action mode to a second mode in a case where the matching degree is smaller than the first threshold value and equal to or greater than the second threshold value, and set the action mode to a third mode in a case where the matching degree is less than the second threshold value.

3. The information processing device according to claim 2, wherein the processing circuitry is further configured to determine an action of the acting subject according to the set action mode.

4. The information processing device according to claim 3, wherein
the second mode is an action mode of performing an action for acquiring the feature data of the target person.

5. The information processing device according to claim 4, wherein
the second mode is an action mode of performing an action for encouraging an action of the target person, and
the processing circuitry is further configured to acquire the feature data of the target person from the action of the target person.

6. The information processing device according to claim 5, wherein
the second mode is an action mode of behaving in a different manner from the first mode or communicating in a different tone from the first mode.

7. The information processing device according to claim 1, wherein the processing circuitry is further configured to derive the matching degree between the feature data of the target person and feature data of each of a plurality of registered users held in the database.

8. The information processing device according to claim 1, wherein
the feature data includes data acquired from voice data or image data.

9. The information processing device according to claim 1, wherein the processing circuitry is further configured to calculate the matching degree by obtaining a distance between the feature data of the target person and the feature data of the registered user held in the database.

10. The information processing device according to claim 1, wherein the processing circuitry is further configured to increase or decrease the derived matching degree, on a basis of a quality of an input signal or recognition accuracy of a sensor.

11. The information processing device according to claim 1, wherein, in a case where the processing circuitry performs user identification processing on a basis of matching degrees of a plurality of types of feature data, correction processing of the matching degrees is performed in a case where a difference between the matching degrees of the plurality of types of feature data is equal to or more than a predetermined threshold value.

12. The information processing device according to claim 1, wherein the processing circuitry is further configured to hold the matching degree between the target person and the first registered user before the time point, and
while continuously deriving the matching degree between the target person and the second registered user, which is greater than the matching degree between the target person and the first registered user, after the time point, reduce the held matching degree.

13. The information processing device according to claim 12, wherein the processing circuitry is further configured to in a case where the matching degree falls below the first threshold value as a result of reduction of the matching degree between the target person and the first registered user, determine that the target person is not the first registered user.

14. The information processing device according to claim 1, wherein the processing circuitry is further configured to derive the matching degree for each of a plurality of types of feature data, and generates an integrated matching degree that integrates the matching degrees of the plurality of types of feature data, and
perform user identification processing by use of the integrated matching degree.

15. A method comprising:
acquiring feature data of a target person;
deriving a matching degree between the feature data and feature data of a registered user held in a database;
determining that the target person is the registered user in a case where the matching degree is equal to or greater than a first threshold value, and that the target person is not the registered user in a case where the matching degree is less than a second threshold value smaller than the first threshold value;
setting an action mode of an acting subject according to the matching degree;
performing correction processing of increasing or decreasing the matching degree derived from the feature data of the target person and the feature data of the registered user held in the database; and
in a case where it is continuously determined on a time-series basis that the target person is a first registered user, determining that the target person is the first registered user even in a case that the derived matching degree between the target person and the first registered user is lower than a matching degree between the target person and a second registered user at a time point.

16. A non-transitory computer-readable storage medium storing computer-readable instructions thereon which, when executed by a computer, cause the computer to perform a method, the method comprising:
    acquiring feature data of a target person;
    deriving a matching degree between the feature data and feature data of a registered user held in a database;
    determining that the target person is the registered user in a case where the matching degree is equal to or greater than a first threshold value, and that the target person is not the registered user in a case where the matching degree is less than a second threshold value smaller than the first threshold value;
    setting an action mode of an acting subject according to the matching degree;
    performing correction processing of increasing or decreasing the matching degree derived from the feature data of the target person and the feature data of the registered user held in the database; and
    in a case where it is continuously determined on a time-series basis that the target person is a first registered user, determining that the target person is the first registered user even in a case that the derived matching degree between the target person and the first registered user is lower than a matching degree between the target person and a second registered user at a time point.

* * * * *